W. S. MILLER.
SPRING CONTROLLER OR GOVERNOR.
APPLICATION FILED OCT. 10, 1916.
1,228,944.
Patented June 5, 1917.
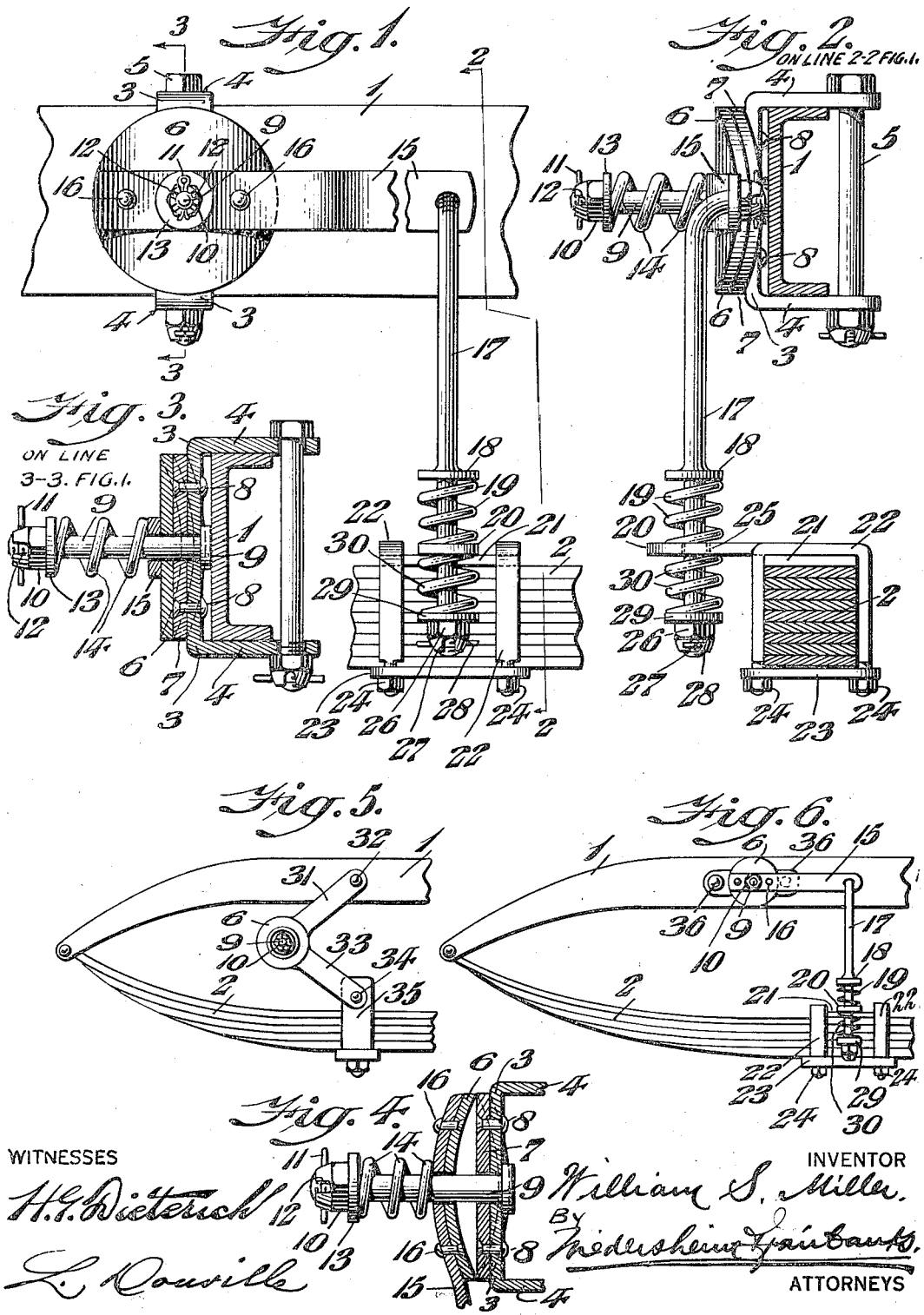
WITNESSES
H. G. Dieterich
L. Douville
INVENTOR
William S. Miller
By Nedersheim Fairbanks
ATTORNEYS

UNITED STATES PATENT OFFICE.

WILLIAM S. MILLER, OF PHILADELPHIA, PENNSYLVANIA, ASSIGNOR TO UTILITY SHOCK ABSORBER COMPANY, OF PHILADELPHIA, PENNSYLVANIA, A CORPORATION OF PENNSYLVANIA.

SPRING CONTROLLER OR GOVERNOR.

1,228,944.      Specification of Letters Patent.      Patented June 5, 1917.

Application filed October 10, 1916. Serial No. 124,781.

*To all whom it may concern:*

Be it known that I, WILLIAM S. MILLER, a citizen of the United States, residing in the city and county of Philadelphia, State of Pennsylvania, have invented a new and useful Spring Controller or Governor, of which the following is a specification.

My present invention consists of a novel spring controller or governor, which has the function of controlling the too rapid movement of the spring, thereby preventing breakage which often occurs in the case of springs which are used in conjunction with self-propelled vehicles.

It further consists of a novel governor comprising two members of novel construction, one of which is resiliently moved toward the other, and a novel construction and arrangement of a connection to the spring and a connection to the vehicle body, whereby the action of the springs under load and their rebound when the load is relieved is compensated without any braking effect on the spring and without materially affecting the elasticity of the spring.

Other novel features of construction and advantage will hereinafter more fully appear in the detailed description of my invention.

For the purpose of illustrating my invention, I have shown in the accompanying drawings, typical embodiments of it, which is practice will give satisfactory and reliable results. It is, however, to be understood that these embodiments are typical only and that the various instrumentalities of which my invention consists may be variously arranged and organized, and that my invention is not limited to the precise arrangement and organization of these instrumentalities as herein shown and described.

Figure 1 represents a side elevation of a spring controller or governor embodying my invention.

Fig. 2 represents a section on line 2—2 of Fig. 1.

Fig. 3 represents a section on line 3—3 of Fig. 1.

Fig. 4 represents a sectional view showing the parts having been turned to bring the two adjusting members at substantially right angles to the position seen in Fig. 3.

Figs. 5 and 6 represent, respectively, side elevations of other embodiments of my invention.

Similar numerals of reference indicate corresponding parts in the figures.

Referring to the drawings:—

1 designates the frame-work of the vehicle body, and 2 represents a vehicle spring, to which parts my novel spring controller or governor is adapted to be connected.

Referring first to Figs. 1 to 4, inclusive, 3 designates a bar or plate having its ends deflected at an angle to form legs 4, through which is adapted to pass a fastening device 5, consisting of a bolt and nut, so that the bar or plate 3 will be rigidly clamped with respect to the channel bar or other member of the frame-work of the vehicle. 6 and 7 designate adjusting members, which, as illustrated, consist of distorted disks, one of which, as for example, the inner disk 7, is secured to the bar 3 by means of fastening devices 8, of any desired type, and in the form illustrated, these fastening devices consist of rivets. The adjusting members 6 and 7 are centrally apertured to receive the shank of a bolt 9, the head of which bears against the inner face of the bar 3, and the shank passes through said bar and is provided at its end with a nut 10 in threaded engagement with the shank and adjustable thereon, and this nut is fixed in its adjusted position by means of a pin 11 which passes through the shank and is received in recesses 12 in the nut 10.

13 designates a washer against which bears one end of a spring 14, the other end of said spring bearing against an arm 15 which is secured to the outer disk 6 by means of fastening devices 16 of any desired type.

17 designates a bolt which passes through the end of the arm 15 and the head of the bolt bears against said arm. The shank of the bolt 17 is provided with a shoulder 18 against which one end of a spring 19 bears, the other end of said spring bearing against an arm 20 which extends from a bar 21 which is fixed with respect to the spring 1 by means of U-shaped clips 22 which surround the spring 1 and pass through a plate 23, said clips being threaded to receive the nuts 24. The arm 20 is apertured, as indicated at 25, in order that the shank of the bolt 17 may pass therethrough, and the end of the shank is threaded to receive a nut 26 which is provided with recesses 27, into which extends a fastening device 28, such as for example, a cotter pin, which passes through an aperture in the shank.

29 designates a washer between which and the extension 20 is interposed a spring 30.

The members 6 and 7 as illustrated, have their juxtaposed faces curving outwardly from their transverse axis, and these members may be formed of castings or they may consist of disks, opposite sides of which are bent laterally, as will be understood by reference to Figs. 2 and 4. In Fig. 4, the outer member 6 is illustrated as having been turned at right angles to the position which this disk assumes in Fig. 3.

In the embodiment seen in Fig. 5, I have illustrated a different manner of connecting the disks 6 and 7 with respect to the vehicle frame 1 and the spring 2. In this embodiment, the inner disk is provided with an arm 31, one end of which is connected with the inner disk, while its opposite end is pivoted at 32 to the vehicle frame-work.

33 designates an arm, one end of which is secured to the outer disk, while its opposite end is pivoted at 34 to a bracket 35 secured to the spring 2 in any desired manner. The two adjusting members have a bolt passing therethrough and are provided with a spring, such parts conforming in construction to that already described with reference to Figs. 1 to 4 inclusive.

In the embodiment seen in Fig. 6, instead of securing the bar 3 to the vehicle body by bending the ends of the bar around so as to surround the channel bar, the ends of the bar are connected by means of fastening devices 36 directly to the frame-work of the vehicle. Otherwise, this construction corresponds to that seen in Figs. 1 and 2.

It will be understood from the foregoing that the action of the spring is accurately controlled on its movement in either direction and any "whipping" of the spring is prevented. If a sudden shock is given to the spring due to the wheels of the vehicle entering a depression in the road or other causes, the movement of the spring is rendered slower and more uniform due to the frictional engagement of the adjusting members 6 and 7, it being understood that such movement is resisted by the compression of the spring 14.

Having thus described my invention, what I claim as new and desire to secure by Letters Patent, is:—

1. In a device of the character stated, the combination with two relatively movable parts and a connecting spring, of two members having their juxtaposed faces curving outwardly from their transverse axis and in friction engagement, one of said members being connected to one part and the other of said members being connected to the other of said parts, and spring means tending to move said members toward each other.

2. In a device of the character stated, the combination with a vehicle frame and its spring, of two members having their juxtaposed faces curving outwardly from their axis and in frictional engagement, resilient means to move said members toward each other, a connection from one of said members to the vehicle frame, and a connection from the other of said members to the spring.

3. In a device of the character stated, the combination with a vehicle frame and its spring, of two members having their juxtaposed faces curving outwardly from their diameter and in frictional engagement, a spring to retain said members in engagement, means to secure one of said members to the vehicle frame, and means to secure the other of said members to the first mentioned spring.

4. In a device of the character stated, the combination with a vehicle frame and its spring, of two members having their juxtaposed faces curving outwardly from their diameter and in frictional engagement, a spring to retain said members in engagement, means to secure one of said members to the vehicle frame, and means to resiliently secure the other of said members to the first mentioned spring.

5. In a device of the character stated, the combination with a vehicle frame and its supporting spring, of two members having their juxtaposed faces curving outwardly from their diameter and in frictional engagement, a spring to maintain such engagement, means to secure one of said members to the vehicle frame, an arm connected with the other of said members, and a bolt passing through said arm and connected with said supporting spring.

6. In a device of the character stated, the combination with a vehicle frame and its supporting spring, of two members having their juxtaposed faces curving outwardly from their diameter and in frictional engagement, a spring to maintain such engagement, means to secure one of said members to the vehicle frame, an arm connected with the other of said members, and a bolt passing through said arm and resiliently connected with said supporting spring.

7. In a device of the character stated, the combination with a vehicle frame and its supporting spring, of two members having their juxtaposed faces curving outwardly from their diameter and in frictional engagement, a spring to maintain such engagement, means to secure one of said members to the vehicle frame, an arm connected with the other of said members, a bolt connected with said arm and provided with a shoulder, a nut at the end of said bolt, a bar connected with said supporting spring and through which said bolt extends, a spring between said shoulder and said bar, and a spring between said bar and said nut.

8. In a device of the character stated, the combination with a vehicle and its supporting spring, of two members having their juxtaposed faces curving outwardly from their diameter and in frictional engagement, a bolt passing through said members and having a nut at its end, a spring between said nut and the adjacent member, means to connect one member to the vehicle frame, and means to connect the other member to said supporting spring.

9. In a device of the character stated, the combination with a vehicle and its supporting spring, of two members having their juxtaposed faces curving outwardly from their diameter and in frictional engagement, a bolt passing through said members and having a nut at its end, a spring between said nut and the adjacent member, a bar secured to said other member, means to secure said bar to the vehicle frame, and means to connect the other member to the supporting spring.

WILLIAM S. MILLER.

Witnesses:
H. S. FAIRBANKS,
C. D. McVAY.